(12) United States Patent
Liu

(10) Patent No.: US 10,267,641 B2
(45) Date of Patent: Apr. 23, 2019

(54) NAVIGATION METHOD AND DEVICE

(71) Applicant: Xiaomi Inc., Beijing (CN)

(72) Inventor: Guoming Liu, Beijing (CN)

(73) Assignee: XIAOMI INC., Beijing (CN)

( * ) Notice: Subject to any disclaimer, the term of this patent is extended or adjusted under 35 U.S.C. 154(b) by 0 days.

(21) Appl. No.: 15/141,815

(22) Filed: Apr. 28, 2016

(65) Prior Publication Data

US 2017/0089714 A1    Mar. 30, 2017

(30) Foreign Application Priority Data

Sep. 29, 2015   (CN) .......................... 2015 1 0634512

(51) Int. Cl.
```
G01C 21/36      (2006.01)
G01S 19/42      (2010.01)
G06K 9/00       (2006.01)
G06K 9/62       (2006.01)
G06F 17/30      (2006.01)
G06F 17/27      (2006.01)
```
(52) U.S. Cl.
CPC .............. *G01C 21/36* (2013.01); *G01S 19/42* (2013.01); *G06F 17/2765* (2013.01); *G06F 17/30796* (2013.01); *G06K 9/00744* (2013.01); *G06K 9/6215* (2013.01)

(58) Field of Classification Search
CPC ..... G01C 21/36; G01S 19/42; G06F 17/2765; G06F 17/30796; G06K 9/00744; G06K 9/6215
See application file for complete search history.

(56) References Cited

U.S. PATENT DOCUMENTS

| 8,762,041 | B2 * | 6/2014 | Lindner ............ G01C 21/3632 701/425 |
| 8,838,381 | B1 | 9/2014 | Daily et al. |
| 2003/0210806 | A1 | 11/2003 | Yoichi et al. |
| 2004/0257440 | A1 | 12/2004 | Kondo et al. |
| 2005/0071886 | A1 * | 3/2005 | Deshpande ........ H04N 7/17336 725/135 |

(Continued)

FOREIGN PATENT DOCUMENTS

| CN | 101131327 A | 2/2008 |
| CN | 101655369 A | 2/2010 |

(Continued)

OTHER PUBLICATIONS

International Search Report for PCT/CN2015/099732.

(Continued)

*Primary Examiner* — Calvin Cheung

(74) *Attorney, Agent, or Firm* — Jun He Law Offices P.C.; James J. Zhu

(57) ABSTRACT

A navigation method and device are provided. The method includes: receiving start point information and end point information sent by a target device; acquiring a target path navigation video from a start point to an end point based on the start point information and the end point information; and sending the target path navigation video to the target device. Accordingly, the target path navigation video is broadcasted in real time, thereby the user may determine whether a deviation occurs between the target path and the actual route in real time, and an accuracy of navigation is improved.

16 Claims, 11 Drawing Sheets

(56) References Cited

U.S. PATENT DOCUMENTS

| | | |
|---|---|---|
| 2005/0128102 A1 | 6/2005 | Obradovich et al. |
| 2009/0254265 A1 | 10/2009 | Reddy et al. |
| 2009/0276151 A1* | 11/2009 | Bucchieri .......... G01C 21/3644 701/423 |
| 2011/0102637 A1 | 5/2011 | Lasseson |
| 2014/0181259 A1 | 6/2014 | You |
| 2014/0372841 A1 | 12/2014 | Mohr |

FOREIGN PATENT DOCUMENTS

| | | |
|---|---|---|
| CN | 101701827 A | 5/2010 |
| CN | 101719130 A | 6/2010 |
| CN | 102012233 A | 4/2011 |
| CN | 104819723 A | 8/2015 |
| CN | 105222802 A | 1/2016 |
| EP | 1357529 A2 | 10/2003 |
| GB | 2337653 A | 11/1999 |
| JP | 2003329462 A | 11/2003 |
| JP | 2006521033 A | 9/2006 |
| JP | 4725375 B2 | 7/2011 |
| JP | 2014006190 A | 1/2014 |
| JP | 2014071595 A | 4/2014 |
| JP | 2014085192 A | 5/2014 |
| KR | 20090000410 A | 1/2009 |
| KR | 20090070048 A | 7/2009 |
| KR | 20090074378 A | 7/2009 |
| KR | 20090080589 A | 7/2009 |
| KR | 20100077981 A | 7/2010 |
| KR | 20110002517 A | 1/2011 |
| KR | 20130125174 A | 11/2013 |
| TW | 201317547 A | 5/2013 |
| WO | 2004003788 A2 | 1/2004 |

OTHER PUBLICATIONS

Park, An-Jin; Jeong-cheol, "Text Cues-based Image Matching Method for Navigation", Korean Information Science1 Society 05 Fall Conference, pp. 631-633, vol. 32, No. 2(11), Korea Information Science Society.

Botuz S. P., "Intellectual Interactive Systems and Control Technologies (Intellectual Property Control Methods and Models in the Internet)", Training manual. 3-rd edition, supplement, SOLON-Press, 2014.—340 p. CD Botuz S. P., "Positioning Systems of the Moving Objects Programmed Control", IPRJ "Radio electronics", 1998. 21 p.

Extended European Search Report for EP Application No. 16174024.6 dated Feb. 14, 2017.

International Search Report for PCT Application No. PCT/CN2015/099732 dated Jul. 5, 2016.

Notice of allowance by Korean Intellectual Property Office for Korean patent application 10-2016-7007053, dated Apr. 3, 2018.

* cited by examiner

NAVIGATION METHOD AND DEVICE

CROSS-REFERENCE TO RELATED APPLICATIONS

This application is based upon and claims priority to Chinese Patent Application No. 201510634512.8, filed Sep. 29, 2015, the entire contents of which are incorporated herein by reference.

TECHNICAL FIELD

The present disclosure relates to the technical field of navigation, and more particularly, to a navigation method and device.

BACKGROUND

At present, with the rapid development of urban modernization, places, such as shopping centers, are becoming larger, and users cannot quickly find their destinations only by depending on the set signs or maps. Thereby, in order to facilitate the users to quickly find the destinations, a navigation method is urgently needed.

In related art, for outdoor navigation, the navigation is substantially performed via maps and location information. While for indoor navigation, in general, an infrared sensor is installed in advance manually, then a position at which the user is located currently may be positioned by the pre-installed infrared sensor. After that, a navigation path is determined based on a start position and an end position of the user. Finally a navigation is carried out based on the position at which the user is located currently and the navigation path.

SUMMARY

The present disclosure provides a navigation method and device.

According to a first aspect of the embodiments of the present disclosure, there is provided a navigation method, including: receiving start point information and end point information sent by a target device; acquiring a target path navigation video from a start point to an end point based on the start point information and the end point information; and sending the target path navigation video to the target device.

According to a second aspect of the embodiments of the present disclosure, there is provided a navigation device, including: a processor; and a memory for storing instructions executable by the processor; wherein the processor is configured to: receive start point information and end point information sent by a target device; acquire a target path navigation video from a start point to an end point based on the start point information and the end point information; and send the target path navigation video to the target device.

According to a third aspect of the embodiments of the present disclosure, there is provided a navigation device, including: a processor; and a memory for storing instructions executable by the processor; wherein the processor is configured to: acquire start point information and end point information; send the start point information and the end point information to a server; receive a target path navigation video from a start point to an end point sent by the server, the target path navigation video being acquired by the server based on the start point information and the end point information; and in response to receiving an instructions for starting navigation, broadcast the target path navigation video.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

Figure 1:
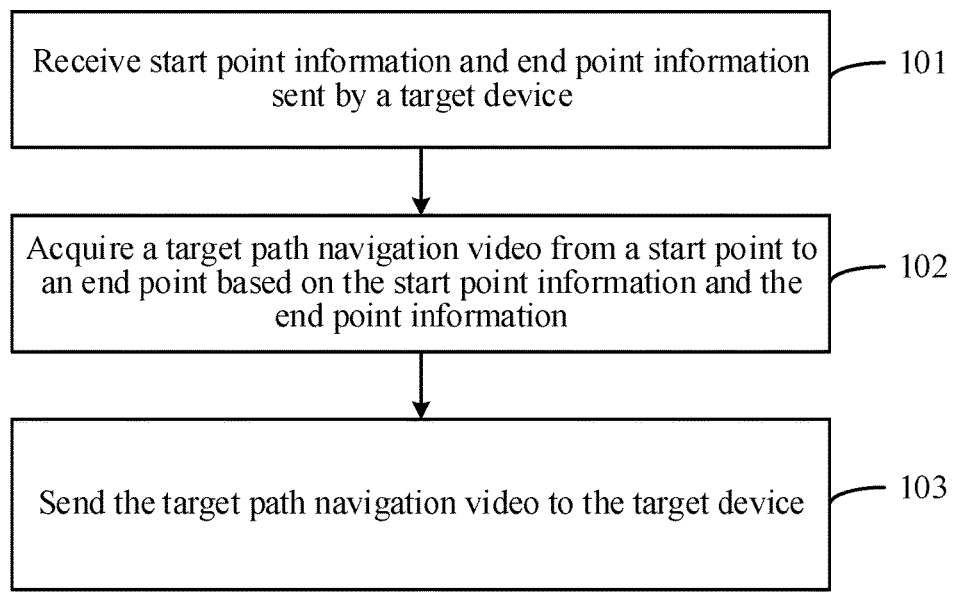
FIG. 1 is a flow chart of a navigation method, according to an exemplary embodiment.

FIG. 1 is a flow chart of a navigation method, according to an exemplary embodiment. As shown in FIG. 1, the navigation method is implemented by a server, and includes the following steps.

In step 101, start point information and end point information sent by a target device are received.

In step 102, a target path navigation video from a start point to an end point is acquired based on the start point information and the end point information.

In step 103, the target path navigation video is sent to the target device.

In the embodiments of the present disclosure, start point information and end point information sent by a target device are received, a target path navigation video from a start point to an end point is acquired based on the start point information and the end point information, and the target path navigation video is sent to the target device, such that the target device performs a navigation based on the target path navigation video. In this way, the navigation may be performed more intuitively, the threshold of navigation is lowered, a uniform infrared sensor installed by manual is saved, the universality and applicability are strong, and a mass of physical apparatuses and labor forces are saved.

In another embodiment of the present disclosure, acquiring the target path navigation video from the start point to the end point based on the start point information and the end point information includes: acquiring the target path navigation video based on start point position information and end point position information, the start point information including the start point position information, and the end point information including the end point position information.

In another embodiment of the present disclosure, the start point information includes a start point environment image, and the end point information includes an end point environment image; and acquiring the target path navigation video based on the start point information and the end point information includes: extracting start point reference information from the start point environment image, and extracting end point reference information from the end point environment image; determining the start point reference information as the start point position information, and determining the end point reference information as the end point position information; and acquiring the target path navigation video based on the start point reference information and the end point reference information.

In another embodiment of the present disclosure, the start point information includes a start point environment image, and the end point information includes an end point environment image; and acquiring the target path navigation video based on the start point information and the end point information includes: extracting start point text information from the start point environment image, and extracting end point text information from the end point environment image; determining the start point text information as the start point position information, and determining the end point text information as the end point position information; and acquiring the target path navigation video based on the start point text information and the end point text information.

In another embodiment of the present disclosure, acquiring the target path navigation video from the start point to the end point based on the start point information and the end point information includes: intercepting the target path navigation video from one stored candidate path navigation video based on the start point information and the end point information.

In another embodiment of the present disclosure, acquiring the target path navigation video from the start point to the end point based on the start point information and the end point information includes: acquiring the target path navigation video from a plurality of stored candidate path navigation videos based on the start point information and the end point information.

In another embodiment of the present disclosure, before the acquiring the target path navigation video from the start point to the end point based on the start point information and the end point information, the method further includes: acquiring a candidate path navigation video.

In another embodiment of the present disclosure, the acquiring the candidate path navigation video includes: acquiring a mobile video and position information, the position information being position information corresponding to a target image captured by a video capturing apparatus in a stationary status during capturing the mobile video; and associating the position information with the target image so as to obtain the candidate path navigation video.

In another embodiment of the present disclosure, the position information includes reference information or text information.

In another embodiment of the present disclosure, after sending the target path navigation video to the target device, the method further includes: receiving a path replanning request sent by the target device; acquiring a new target path navigation video based on the path replanning request; and sending the new target path navigation video to the target device, such that the target device performs a navigation based on the new target path navigation video.

Any combination of all the above-mentioned optional technical solutions may form an alternative embodiment of the present disclosure, and the embodiments of the present disclosure will not be elaborated one by one herein.

Figure 2:
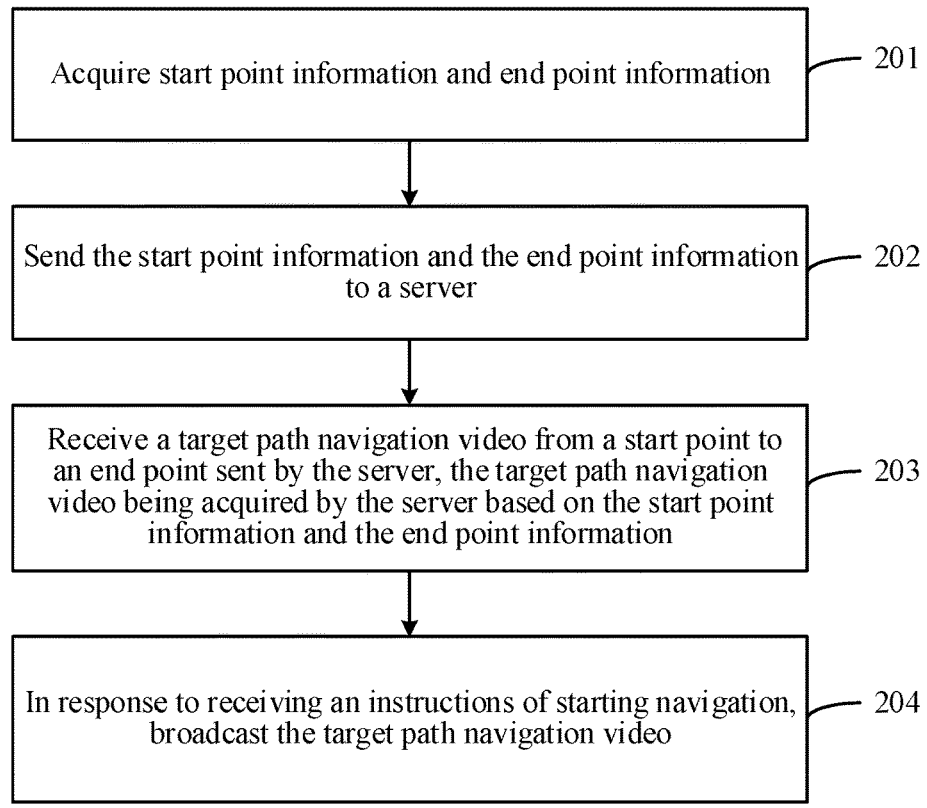
FIG. 2 is a flow chart of a navigation method, according to an exemplary embodiment.

FIG. 2 is a flow chart of a navigation method, according to an exemplary embodiment. As shown in FIG. 2, the navigation method is implemented by a target device, and includes the following steps.

In step 201, start point information and end point information are acquired.

In step 202, the start point information and the end point information are sent to a server.

In step 203, a target path navigation video from a start point to an end point sent by the server is received, the target path navigation video being acquired by the server based on the start point information and the end point information.

In the embodiments of the present disclosure, start point information and end point information sent by a target device are received, a target path navigation video from a start point to an end point is acquired based on the start point information and the end point information, and the target path navigation video is sent to the target device, such that the target device performs a navigation based on the target path navigation video. In this way, the navigation may be performed more intuitively, the threshold of navigation is lowered, a uniform infrared sensor installed by manual is saved, the universality and applicability are strong, and a mass of physical apparatuses and labor forces are saved.

In another embodiment of the present disclosure, the start point information includes a start point environment image, and the end point information includes an end point environment image; and acquiring the start point information and the end point information includes: when receiving a navigation instruction, acquiring the start point environment image and the end point environment image.

In another embodiment of the present disclosure, broadcasting the target path navigation video includes: detecting a current movement speed; and broadcasting the target path navigation video based on the movement speed, such that a broadcasting speed of the target path navigation video is equal to the movement speed.

In another embodiment of the present disclosure, the broadcasting the target path navigation video includes: when a target image position in the target path navigation video is broadcasted, displaying route confirmation prompt information, the route confirmation prompt information being configured to prompt a user to confirm whether a deviation from the target path occurs, the position information being position information corresponding to a target image captured by a video capturing apparatus in a stationary status during capturing the mobile video; and when receiving a route replanning instruction based on the route confirmation prompt information, sending a route replanning request to the server, such that the server acquires a new target path navigation video based on the route replanning request.

In another embodiment of the present disclosure, the method further includes: acquiring a mobile video and position information; and sending the mobile video and the position information to the server, such that the server associates the mobile video with a target image.

In another embodiment of the present disclosure, the method further includes: acquiring a mobile video and position information; associating the mobile video with a target image so as to obtain a candidate path navigation video; and sending the candidate path navigation video to the server.

Any combination of all the above-mentioned optional technical solution may form an alternative embodiment of the present disclosure, and the embodiments of the present disclosure will not be elaborated one by one herein.

Figure 3:
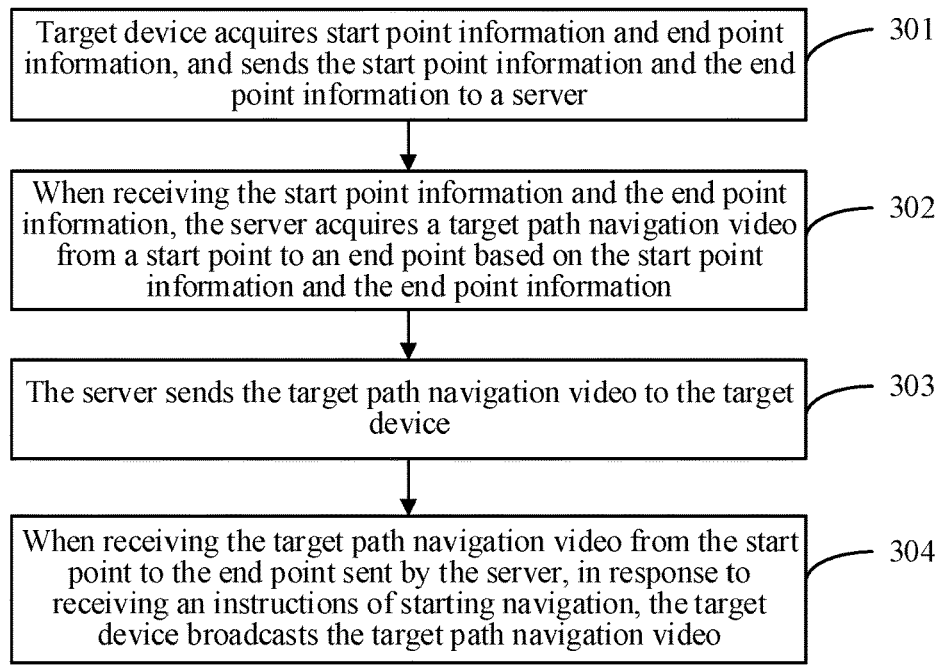
FIG. 3 is a flow chart of a navigation method, according to an exemplary embodiment.

FIG. 3 is a flow chart of a navigation method, according to an exemplary embodiment. As shown in FIG. 3, the method includes the following steps.

In step 301, the target device acquires start point information and end point information, and sends the start point information and the end point information to a server.

In the embodiments of the present disclosure, the start point information and the end point information not only may be text information, image information, voice information, and the like, but also may be a combination of at least two information among the text information, the image information, and the voice information, which is not particularly defined by the embodiments of the present disclosure.

When the start point information and the end point information are the image information, i.e., the start point information includes a start point environment image, and the end point information includes an end point environment image. When receiving a navigation instruction, the target device may acquire the start point environment image and the end point environment image, determine the start point environment image as the start point information, determine the end point environment image as the end point information, and then send the start point information and the end point information to the server.

When acquiring the start point environment image, the target device may capture an image of an environment of currently located position so as to obtain the start point environment image. In order to improve an effective utilization of the start point environment image, when capturing an image of an environment of a position where the target device is located currently (i.e., current position of the target device), the target device may capture an image of a position having text information or a position having a reference in the current position, so as to obtain the start point environment image. The text information is a noticeable word at the current position of the target device, and is configured to identify the current position of the target device. The reference may be a building, a bus stop board, and the like, which are not particularly defined by the embodiments of the present disclosure.

When acquiring the end point environment image, the target device not only may directly search for it from an image library stored in the target device, but also may acquire the end point environment image from the server, which is not particularly defined by the embodiments of the present disclosure.

When acquiring the end point environment image from the server, the target device may receive end point image descriptive information inputted by a user, and send the end point image descriptive information to the server. When receiving the end point image descriptive information, the server may acquire at least one image matched with the end point image descriptive information from the stored image library, and send the at least one image to the target device. When receiving the at least one image, the target device may display the at least one image. When receiving an instruction of selecting a designated image, the target device may determine the designated image as the end point environment image, the designated image being any image among the at least one image.

It should be explained, the end point image descriptive information may not only be text information, voice information and the like, but may also be a combination of at least two information in the text information and the voice information, which is not particularly defined by the embodiments of the present disclosure. In addition, the instruction of selecting a designated image is used for selecting a designated image from the at least one image, and may be triggered by the user. The user may trigger the instruction of selecting a designated image via a designated operation, and the designated operation may be a click operation, a swipe operation, a voice operation, and the like, which is not particularly defined by the embodiments of the present disclosure.

It should also be explained that, when the target device directly searches for the end point environment image from the image library stored in the target device via the user, it is necessary to store the image library in the target device. When there are many images in the image library, the occupied storage space of the target device is relatively large. In order to realize navigation, each apparatus to be navigated needs to store the image library. However, when the target device acquires the end point environment image from the server, since the image library is stored in the server, all the apparatuses needing navigation can acquire the image from server, which saves the storage space of the apparatus. But the apparatus needs to interact with the server, which increases an interaction number and interaction time. Thereby, in actual applications, different acquiring manners may be selected for different requirements, which is not particularly defined by the embodiments of the present disclosure.

The target device may be smart glasses, a smart phone, a smart watch, and the like, which is not particularly defined by the embodiments of the present disclosure.

In addition, the navigation instruction is used for navigation, and may be triggered by the user via a designated operation, which is not particularly defined by the embodiments of the present disclosure. Moreover, the navigation method provided by the embodiments of the present disclosure may not only be applied in the indoor navigation, but also in the outdoor navigation, which is also not particularly defined by the embodiments of the present disclosure.

Further, the navigation method provided by the embodiments of the present disclosure may not only be applied in the indoor navigation, but also be applied in the outdoor navigation. The indoor navigation is performing a navigation on an indoor position of the currently located place, the indoor position of the currently located place is generally obtained via the position of the currently located place, and the position of the currently located place may be determined by geographical location information of the currently located place. Thereby, in order to improve an accuracy of the indoor navigation, the target device may determine the geographical location information of the currently located place, then send the geographical location information of the currently located place to the server. The outdoor navigation is a navigation between two different outdoor positions, and the two different outdoor positions are also generally determined by the position information. That is, the outdoor navigation needs to determine start point geographical location information and end point geographical location information. Therefore, in order to improve an accuracy of the outdoor navigation, the target device may further determine the geographical location information of the current position, determine the geographical location information of the current position as the start point geographical location information, and determine the end point geographical location information, and then send the start point geographical location information and end point geographical location information to the server.

For the outdoor navigation, when determining the end point geographical location information, the target device may receive end point image descriptive information inputted by a user, and send the end point image descriptive information to the server. When receiving the end point image descriptive information, the server may acquire at least one geographical location information matched with the end point descriptive information, and send the at least one geographical location information to the target device. When receiving the at least one geographical location information, the target device may display the at least one geographical location information. When receiving an instruction of selecting designated geographical location information, the target device may determine the designated geographical location information as the end point geographical location information, the designated geographical location information being any geographical location information among the at least one geographical location information.

It should be explained that, the target device may determine the geographical location information of the current position via GPS (Global Positioning System) positioning, a manual input, or a combination of the GPS positioning and the manual input. The geographical location information may be text information, voice information, or a combination of the text information and the voice information, which are not particularly defined by the embodiments of the present disclosure.

In addition, the instruction of selecting designated geographical location information is used for selecting the designated geographical location information from the at least one geographical location information, and the instruction of selecting designated geographical location information may be triggered by a user via a designated operation, which are not particularly defined by the embodiments of the present disclosure.

In step 302, when receiving the start point information and the end point information, the server acquires a target path navigation video from a start point to an end point based on the start point information and the end point information.

In order to navigate more intuitively, the embodiments of the present disclosure perform the navigation via the navigation video. That is, when receiving the start point information and the end point information, the server needs to acquire the target path navigation video from a start point to an end point based on the start point information and the end point information. When acquiring the target path navigation video from the start point to the end point based on the start point information and the end point information by the server, the server may acquire the target path navigation video based on start point position information and end point position information, wherein the start point information includes the start point position information, and the end point information includes the end point position information.

As mentioned in the above step 301, the start point information may include a start point environment image, and the end point information includes an end point environment image. The start point information and the end point information may not only be reference information, but also be text information, and certainly, may be GPS information and the like. Illustrations of the embodiments of the present disclosure are given by using a condition in which the start point information and the end point information are reference information or text information, thereby acquiring the target path navigation video based on the start point information and the end point information may include the following two manners.

In the first manner, the server extracts start point reference information from the start point environment image, and extracts end point reference information from the end point environment image; determines the start point reference information as the start point position information, and determines the end point reference information as the end point position information; and acquires the target path navigation video based on the start point reference information and the end point reference information.

When acquiring the target path navigation video based on the start point reference information and the end point reference information, the server may intercept the target path navigation video from one stored candidate path navigation video based on the start point reference information and the end point reference information. Alternatively, the server may acquire the target path navigation video from a plurality of stored candidate path navigation videos based on the start point reference information and the end point reference information.

The operation of intercepting the target path navigation video from one stored candidate path navigation video based on the start point reference information and the end point reference information by the server may be as follows: the server parses multiple frames of video screens from the candidate path navigation video, and respectively extracts one piece of candidate reference information from the multiple frames of video screens so as to obtain multiple pieces of candidate reference information; then selects the candidate reference information same with the start point reference information from the multiple pieces of candidate reference information and determines a video screen having the selected candidate reference information as a start point video screen; and selects the candidate reference information same with the end reference information from the multiple pieces of candidate reference information and determines a video screen having the selected candidate reference information as an end point video screen. After that, the server intercepts a video between the start point video screen and the end point video screen from the candidate path navigation video, so as to obtain the target path navigation video.

When the server acquires the target path navigation video from the stored multiple candidate path navigation videos based on the start point reference information and the end point reference information, each of the multiple candidate path navigation videos includes one piece of start point candidate reference information and one piece of end point candidate reference information. Thereby, when selecting the target path navigation video from the stored multiple candidate path navigation videos based on the start point reference information and the end point reference information, the server may acquire the start point candidate reference information and the end point candidate reference information of the multiple candidate path navigation videos; select a candidate path navigation video having the start point candidate reference information same with the start point reference information from the multiple candidate path navigation videos based on the start point candidate reference information of the multiple candidate path navigation videos; judge whether the end point candidate reference information of the selected candidate path navigation video is the same as the end point reference information. When the end point candidate reference information of the selected candidate path navigation video is not the same as the end point reference information, the server uses the end point candidate reference information of the selected candidate path navigation video as the start point reference information, and returns to perform the step of selecting a candidate path navigation video having the start point candidate reference information same with the start point reference information from the multiple candidate path navigation videos based on the start point candidate reference information of the multiple candidate path navigation videos, until end point text identification of the selected candidate path navigation video is the same as the end point reference information. In this way, the server may select at least one candidate path navigation video on the target path from the multiple candidate path navigation videos, and form the at least one candidate path navigation video into the target path navigation video.

In the second manner, the server extracts start point text information from the start point environment image, and extracts end point text information from the end point environment image; determines the start point text information as the start point position information, and determines the end point text information as the end point position information; and acquires the target path navigation video based on the start point text information and the end point text information.

With respect to the second manner, the server may perform a text recognition on the start point environment image so as to obtain the start point text information, and perform a text recognition on the end point environment image so as to obtain the end point text information. Then the server intercepts the target path navigation video from the stored one candidate path navigation video based on the start point text information and the end point text information. Alternatively, the server may perform a text recognition on the start point environment image so as to obtain the start point text information, and perform a text recognition on the end point environment image so as to obtain the end point text information, and then acquire the target path navigation video from the stored multiple candidate path navigation videos based on the start point text information and the end point text information.

The operation of intercepting the target path navigation video from one stored candidate path navigation video based on the start point text information and the end point text information by the server may be as follows: the server parses multiple frames of video screens from the candidate path navigation video, and respectively extracts one piece of candidate text information from the multiple frames of video screens so as to obtain multiple pieces of candidate text information; then selects the candidate text information same with the start point text information from the multiple pieces of candidate text information and determines a video screen having the selected candidate text information as a start point video screen; and selects the candidate text information same with the end text information from the multiple pieces of candidate text information and determines a video screen having the selected candidate text information as an end point video screen. After that, the server intercepts a video between the start point video screen and the end point video screen from the candidate path navigation video, so as to obtain the target path navigation video.

In the embodiments of the present disclosure, each of the multiple candidate path navigation videos may include start point candidate text information and end point candidate text information. Thereby, when selecting the target path navigation video from the stored multiple candidate path navigation videos based on the start point text information and the end point text information, the server may acquire the start point candidate text information and the end point candidate text information of the multiple candidate path navigation videos; select a candidate path navigation video having the start point candidate text information same with the start point text information from the multiple candidate path navigation videos based on the start point candidate text information of the multiple candidate path navigation videos; determine whether the end point candidate text information of the selected candidate path navigation video is the same with the end point text information; when the end point candidate text information of the selected candidate path navigation video is not the same with the end point text information, use the end point candidate text information of the selected candidate path navigation video as the start point text information, return to perform the step of selecting the candidate path navigation video having the start point candidate text information same with the start point text information from the multiple candidate path navigation videos based on the start point candidate text information of the multiple candidate path navigation videos, until an end point text identification of the selected candidate path navigation video is the same as the end point reference information. In this way, the server may select at least one candidate path navigation video on the target path from the multiple candidate path navigation videos, and form the at least one candidate path navigation video into the target path navigation video.

For example, the server performs a text recognition on the start point environment image so as to obtain start point text information A, and performs a text recognition on the end point environment image so as to obtain end point text information F. Assuming that the multiple candidate path navigation videos acquired by the server are respectively a navigation video 21, a navigation video 22, a navigation video 23, a navigation video 24, and a navigation video 25, the start point candidate text information of the navigation video 21 is A, the end point candidate text information of the navigation video 21 is B, the start point candidate text information of the navigation video 22 is D, the end point candidate text information of the navigation video 22 is F, the start point candidate text information of the navigation video 23 is B, the end point candidate text information of the navigation video 23 is D, the start point candidate text information of the navigation video 24 is the end point candidate text information of the navigation video 24 is H, the start point candidate text information of the navigation video 25 is M, the end point candidate text information of the navigation video 25 is N, the candidate path navigation video having the start point candidate text information same with the start point text information selected from the five candidate path navigation videos based on the start point text information A by the server is the navigation video 21, but the end point candidate text information B of the navigation video 21 is different from the end point text information F. Thereby, the server uses the end point candidate text information B of the navigation video 21 as the start point text information; the candidate path navigation video having the start point candidate text information same with the start point text information selected from the five candidate path navigation videos is the navigation video 23, but the end point candidate text information D of the navigation video 23 is different from the end point text information F, thereby, the server uses the end point candidate text information D of the navigation video 23 as the start point text information; the candidate path navigation video having the start point candidate text information same with the start point text information selected from the five candidate path navigation videos is the navigation video 22, and the end point candidate text information F of the navigation video 22 is the same with the end point text information F. At this time, the server determines the navigation video 21, the navigation video 23, and the navigation video 22 as at least one candidate path navigation video on the target path, and composes a target path navigation video based on the at least one candidate path navigation video.

It should be explained that the server may acquire the target path navigation video according to the above two manners respectively, and the server may also combine the above two manners to acquire the target path navigation video, so as to improve the accuracy of acquiring the target path navigation video.

In addition, the above-mentioned start point information and the end point information not only may be text information, image information, but also may be GPS information, and the like. Thereby, the server may not only acquire the target path navigation video based on the start point position information and the end point position information via the above methods, the server may also intercept the target path navigation video from the stored one candidate path navigation video based on the start point information and the end point information. Alternatively, the server may acquire the target path navigation video from the stored multiple candidate path navigation videos based on the start point information and the end point information. Meanwhile, the method of intercepting the target path navigation video from the stored one candidate path navigation video based on the start point information and the end point information by the server may be the same as the above methods, and the method of acquiring the target path navigation video from the stored multiple candidate path navigation videos based on the start point information and the end point information by the server may be the same as the above methods, which are not elaborated by the embodiments of the present disclosure.

Further, before acquiring the target path navigation video from the start point to the end point based on the start point information and the end point information by the server, the server may further acquire a candidate path navigation video.

When acquiring a candidate path navigation video, the server may acquire a mobile video and position information, the position information being position information corresponding to a target image captured by a video capturing apparatus in a stationary status during capturing the mobile video. Then the server associates the position information with the target image so as to obtain the candidate path navigation video. The position information may include reference information or text information. In actual applications, the position information may further include other information, such as geographical location information, which is not particularly defined by the embodiments of the present disclosure.

Further, when performing the outdoor navigation, and the server receives the start point geographical location information and the end point geographical location information sent by the target device, in order to improve an accuracy of the outdoor navigation, the server may also intercept a navigation video between the start point geographical location and the end point geographical location from the stored one candidate path navigation video based on the start point geographical location information and the end point geographical location information, and intercept the target path navigation video from the intercepted navigation video according to the above methods. At this time, the geographical location information of each video screen is associated in the candidate path navigation video. When acquiring the target path navigation video from the stored multiple candidate path navigation videos, the server may also select the candidate path navigation video between the start point geographical location and the end point geographical location from the multiple candidate path navigation videos based on the start point geographical location information and the end point geographical location information, and acquire the target path navigation video from the selected candidate path navigation video according to the above methods.

When performing the indoor navigation, the multiple candidate path navigation videos may be candidate path navigation videos of multiple places. That is, the multiple candidate path navigation videos may be candidate path navigation videos corresponding to multiple geographical location information, and when the multiple candidate path navigation videos store candidate path navigation videos corresponding to multiple geographical location information, generally a corresponding relationship between the geographical location information and the candidate path navigation videos is stored, and places of each geographical location information may include multiple indoor spaces. Thereby, in order to perform the indoor navigation at the places of the geographical location information, and improve the accuracy of the indoor navigation, when receiving the geographical location information of current position of the target device, the server may acquire multiple candidate path navigation videos corresponding to the geographical location information from the corresponding relationship between the geographical location information and the candidate path navigation video based on the geographical location information, and then acquire the target path navigation video from the multiple candidate path navigation videos corresponding to the geographical location information.

Further, before the server acquires the multiple candidate path navigation videos corresponding to the geographical location information from the multiple candidate path navigation videos, the mobile video and the position information acquired by the server may be sent by a plurality of video capturing apparatuses, or may be sent by one video capturing apparatus, and when the position information is the geographical location information, the position information corresponding to each target image in the mobile video is the same. Thereby, the server may receive the mobile video and the geographical location information sent by at least one video capturing apparatus. For each video capturing apparatus among the at least one video capturing apparatus, the server may identify a plurality of target images from the mobile video sent by the video capturing apparatus; decompose the mobile video sent by the video capturing apparatus based on the plurality of target images to obtain a plurality of candidate path navigation videos; and store the plurality of candidate path navigation videos based on the geographical location information of the video capturing apparatus.

Since the mobile video may include a plurality of target images, and each target image is obtained by capturing the indoor position having reference information or text information, the plurality of target images identified from the mobile video may distinguish a plurality of indoor positions. That is, the mobile video may identify a plurality of indoor positions. In addition, since there may be a plurality of indoor positions on one path, and the indoor positions on different paths may be different. That is, the target path navigated by the target device may be different from the path corresponding to the mobile video uploaded by the video capturing apparatus. Thereby, in order to form a mass of paths so as to satisfy the navigation requirements of more users, the server may decompose the mobile video based on the plurality of target images in the mobile video so as to obtain a plurality of candidate path navigation videos.

Since one video may include a plurality of frames of video images, and when there are at least two frames of consecutive video images having the same image in the plurality of frames of video images, the at least two frames of consecutive video images having the same image may be determined as the target image. Thereby, when identifying the plurality of target images from the mobile video sent by the video capturing apparatus, the server may acquire the plurality of frames of video images included in the mobile video, and compare the adjacent video images in the plurality of frames of video images, and when there are at least two frames of consecutive video images having the same image in the plurality of frames of video images, the server may determine the at least two frames of consecutive video images having the same image as the target image, and then identify the plurality of target images from the mobile video.

Alternatively, the server may also determine a similarity between the adjacent at least two frames of video images in the plurality of frames of video images, and when the similarity between the adjacent at least two frames of video images is greater than a designated similarity, determine the adjacent at least two frames of video images as the target image of the mobile video. The designated similarity may be designated in advance. For example, the designated similarity may be 80%, 90%, and the like, which is not particularly defined by the embodiments of the present disclosure.

For example, the mobile video sent by the video capturing apparatus is a mobile video 1, the multiple frames of video images included in the mobile video 1 acquired by the server are respectively an image 1, an image 2, an image 3, an image 4, an image 5, an image 6, an image 7, an image 8, an image 9, an image 10, . . . , and an image 50. The server compares the adjacent video images in the multiple frames of video images, determines that the image 1, the image 2 and the image 3 in the multiple frames of video images are consecutive video images having the same image, determines that the image 8 and the image 9 are consecutive video images having the same image, determines that the image 15, the image 16 and the image 17 are consecutive video images having the same image, determines that the image 22, the image 23 and the image 24 are consecutive video images having the same image, determines that the image 30 and the image 31 are consecutive video images having the same image, determines that the image 43, the image 44 and the image 45 are consecutive video images having the same image, and determines that the image 49 and the image 50 are consecutive video images having the same image. Then the image 1, the image 2 and the image 3 are determined as a first target image of the mobile video, the image 8 and the image 9 are determined as a second target image of the mobile video, the image 15, the image 16 and the image 17 are determined as a third target image of the mobile video, the image 22, the image 23 and the image 24 are determined as a fourth target image of the mobile video, the image 31 and the image 32 are determined as a fifth target image of the mobile video, the image 43, the image 44 and the image 45 are determined as a sixth target image of the mobile video, and the image 49 and the image 50 are determined as a seventh target image of the mobile video.

The operation of decomposing the mobile video sent by the video capturing apparatus based on the multiple target images so as to obtain multiple candidate path navigation videos by the server may be as follows: performing a text recognition on the multiple target images respectively so as to obtain multiple key text information; and decomposing the mobile video sent by the video capturing apparatus based on the multiple key text information so as to obtain multiple candidate path navigation videos, wherein all the multiple candidate path navigation videos include the start point candidate text information and the end point candidate text information, and the end point candidate text information of the first candidate path navigation video is the same as the start point candidate text information in the second candidate path navigation video in the multiple candidate path navigation videos, the first candidate path navigation video and the second candidate path navigation video are any candidate path navigation video in the multiple candidate path navigation videos, and the second candidate path navigation video is an adjacent candidate path navigation video next to the first candidate path navigation video.

Alternatively, the server performs a text recognition on the multiple target images so as to obtain multiple key reference information; decomposes the mobile video sent by the video capturing apparatus based on the multiple key reference information so as to obtain multiple candidate path navigation videos, wherein all the multiple candidate path navigation videos include start point candidate reference information and end point candidate reference information, and the end point candidate reference information of the first candidate path navigation video is the same as the start point candidate reference information in the second candidate path navigation video in the multiple candidate path navigation videos, the first candidate path navigation video and the second candidate path navigation video are any candidate path navigation video in the multiple candidate path navigation videos, and the second candidate path navigation video is an adjacent candidate path navigation video next to the first candidate path navigation video.

In addition, the operation of storing the multiple candidate path navigation videos based on the geographical location information of the video capturing apparatus by the server may be as follows: the server may store the geographical location information of the video capturing apparatus and the multiple candidate path navigation videos in the corresponding relationship between the geographical location information and the candidate path navigation video.

For example, the multiple target images identified from the mobile video 1 by the server are respectively the image 1, the image 8, the image 16, the image 23, the image 30, the image 44 and the image 49. The server performs a text recognition on the multiple images. Then the obtained key text information of the image 1 is A, the obtained key text information of the image 8 is B, the obtained key text information of the image 16 is C, the obtained key text information of the image 23 is D, the obtained key text information of the image 30 is E, the obtained key text information of the image 44 is F, and the obtained key text information of the image 49 is G Based on the multiple key text information, the mobile video 1 is decomposed into multiple candidate path navigation videos, which are respectively the navigation video 1, the navigation video 2, the navigation video 3, the navigation video 4, the navigation video 5, and the navigation video 6. The start point text information of the navigation video 1 is A, the end point text information of the navigation video 1 is B, the start point text information of the navigation video 2 is B, the end point text information of the navigation video 2 is C, the start point text information of the navigation video 3 is C, the end point text information of the navigation video 3 is D, the start point text information of the navigation video 4 is D, the end point text information of the navigation video 4 is E, the start point text information of the navigation video 5 is E, the end point text information of the navigation video 5 is F, the start point text information of the navigation video 6 is F, the end point text information of the navigation video 6 is G In the event that the geographical location information of the video capturing apparatus is the geographical location information 1, then the server may store the geographical location information 1 and the multiple candidate path navigation videos in the corresponding relationship between the geographical location information and the candidate path navigation video as shown in Table 1 below.

TABLE 1

| Geographical location information | Candidate path navigation video |
|---|---|
| Geographical location information 1 | The navigation video 1, the navigation video 2, the navigation video 3, the navigation video 4, the navigation video 5, and the navigation video 6 |
| Geographical location information 2 | The navigation video 11, the navigation video 12, the navigation video 13, the navigation video 14, and the navigation video 15 |
| . . . | . . . |

It should be explained, the embodiments of the present disclosure are only illustrated by using the corresponding relationship between the geographical location information and the candidate path navigation video as shown in the above Table 1, which does not tend to limit the embodiments of the present disclosure.

In addition, the target device may be any apparatus of the multiple video capturing apparatuses. The target device may also be other apparatus in addition to the multiple video capturing apparatuses. That is, the target device may be a video capturing apparatus, or may be an apparatus in addition to the video capturing apparatus, which is not particularly defined by the embodiments of the present disclosure.

Further, since the target device may be the video capturing apparatus, the target device may also acquire the mobile video and the position information; send the mobile video and the position information to the server, such that the server associates the mobile video with the position information. Then, the server may also decompose the mobile video into multiple candidate path navigation videos, and store the multiple candidate path navigation videos. Alternatively, the target device may also acquire the mobile video and the position information, associate the mobile video with the position information to obtain a candidate path navigation video, and send the candidate path navigation video to the server.

The server needs to identify multiple target images from the mobile video sent by the video capturing apparatus, and decompose the mobile video based on the multiple target images, and the text identification in the multiple target images is used for identifying the indoor positions. Thereby, when recording the mobile video on the route of walk, the target device needs to stay at the position having the reference information or having the text information, in this way, a plurality of target images are formed in the mobile video. The dwell time of the target device at the position having the reference information or having the text information may be determined by the user, and the dwell time may be 1 second, 2 seconds, and the like, which is not particularly defined by the embodiments of the present disclosure.

It should be explained that, when performing an indoor navigation, the video images included in the mobile video sent by the video capturing apparatus or the target device may be images of an indoor position, thereby the video images included in the stored candidate path navigation video may also be images of the indoor position.

In addition, the method of recognizing text in the multiple target images by the server may be referred to the relevant technology, which is not elaborated in the embodiments of the present disclosure.

Furthermore, the server stores the candidate path navigation video based on the corresponding relationship between the geographical location information and the candidate path navigation video. Thereby an accurate matching between the candidate path navigation video and the corresponding geographical location information may be achieved, and an efficiency and an accuracy of the indoor navigation are improved. The multiple video capturing apparatuses send the captured mobile video and the geographical location information of a position at which the mobile video is captured to the server, thereby the server may timely update the stored multiple candidate path navigation videos, which further improves the accuracy of navigation.

In step 303, the server sends the target path navigation video to the target device.

It can be known from the above step 302, the target path navigation video may be obtained by intercepting one candidate path navigation video, or may be composed of at least one candidate path navigation video. When the target path navigation video is composed of at least one candidate path navigation video, the server may determine a path sequence of the at least one candidate path navigation video based on the start point candidate text information and the end point candidate text information of the at least one candidate path navigation video, and send the path sequence and the at least one candidate path navigation video to the target device. Also, the server may send the at least one candidate path navigation video to the target device based on the path sequence, such that the target device determines a path sequence of the at least one candidate path navigation video based on the receiving time of the at least one candidate path navigation video. If a failure occurs in a network between the server and the target device, the receiving sequence of the at least one candidate path navigation video will be different from the path sequence determined by the server, then the path sequence determined by the target device will be different from the path sequence determined by the server side. Thereby, when receiving the at least one candidate path navigation video, the target device may also perform a text recognition on the at least one candidate path navigation video, so as to determine the path sequence of the at least one candidate path navigation video based on the start point candidate text information and the end point candidate text information of the at least one candidate path navigation video, or the server may extract the start point candidate reference information and the end point candidate reference information from the at least one candidate path navigation video, so as to determine the path sequence of the at least one candidate path navigation video based on the start point candidate reference information and the end point candidate reference information of the at least one candidate path navigation video, which is not particularly defined by the embodiments of the present disclosure.

When determining the path sequence of the at least one candidate path navigation video based on the start point candidate text information and the end point candidate text information of the at least one candidate path navigation video by the server, the server selects, for the third candidate path navigation video, a candidate path navigation video having the start point candidate text information same with the end point candidate text information of the third candidate path navigation video from a video set, the third candidate path navigation video being any candidate path navigation video among the at least one candidate path navigation video, and the video set including the rest candidate path navigation video in addition to the third candidate path navigation video; sets the path sequence of the selected candidate path navigation video to be after the third candidate path navigation video; judges whether there is other candidate path navigation video in addition to the selected candidate path navigation video in the video set, if yes, uses the selected candidate path navigation video as the third candidate path navigation video, and removes the selected candidate path navigation video from the video set to update the video set, and returns to perform the step of selecting a candidate path navigation video having the start point candidate text information same with the end point candidate text information of the third candidate path navigation video from the video set based on the updated video set, until there is no candidate path navigation video in the video set, thereby determining the path sequence of the at least one candidate path navigation video.

The method of determining the path sequence of the at least one candidate path navigation video based on the start point candidate reference information and the end point candidate reference information of the at least one candidate path navigation video by the server is the same as the method of determining the path sequence based on the text information, which is not elaborated in the embodiments of the present disclosure.

For example, the at least one candidate path navigation video are the navigation video 21, the navigation video 23, and the navigation video 22. The start point candidate text information of the navigation video 21 is A, the end point candidate text information of the navigation video 21 is B, the start point candidate text information of the navigation video 22 is D, the end point candidate text information of the navigation video 22 is F, the start point candidate text information of the navigation video 23 is B, and the end point candidate text information of the navigation video 23 is D. Assuming that the third candidate path navigation video is the navigation video 21, then the navigation video 22 and the navigation video 23 constitute a video set, from the video set, a candidate path navigation video having the end point candidate text information same with the end point candidate text information B of the navigation video 21 is selected to be the navigation video 23. It is determined that there is other candidate path navigation video in addition to the navigation video 23 in the video set, then the navigation video 23 is used as the third candidate path navigation video, and the navigation video 23 is removed from the video set to obtain an updated video set, from the updated video set, a candidate path navigation video having the end point candidate text information same as the end point candidate text information D of the navigation video 23 is selected to be the navigation video 22. It is determined that there is no other candidate path navigation video in the updated video set in which the navigation video 22 is removed, thereby, the path sequence of the at least one candidate path navigation video is the navigation video 21, the navigation video 23, and the navigation video 22.

It should be explained that, when determining the target path navigation video, the server may determine multiple navigation path videos, and then select one default navigation path video from the multiple navigation path videos, and determine the default navigation path video as the target path navigation video and send it to the target device, such that the target device performs a navigation based on the target path navigation video. Also, the server may respectively send the multiple navigation path videos to the target device, such that the user selects one navigation path video from the multiple navigation path videos to perform the navigation, which is not particularly defined by the embodiments of the present disclosure.

In step 304, when the target device receives the target path navigation video from the start point to the end point sent by the server, in response to the received navigation triggering operation, the target path navigation video is broadcasted.

When the target device receives the target path navigation video from the start point to the end point sent by the server, if the target device receives a navigation triggering operation, the target device may respond to the navigation triggering operation and broadcast the target path navigation video. The navigation triggering operation may be triggered by the user, which is not particularly defined by the embodiments of the present disclosure.

When the target device broadcasts the target path navigation video, the target device may also detect a current moving speed, and then broadcast the target path navigation video based on the current moving speed, such that the broadcasting speed of the target path navigation video is equal to the current moving speed, which improves the navigation effect.

When the target path navigation video is composed of at least one candidate path navigation video, since the at least one candidate path navigation video has a certain path sequence, when the target device performs a navigation based on the at least one candidate path navigation video, the target device may broadcast the at least one candidate path navigation video based on the path sequence of the at least one candidate path navigation video; for each candidate path navigation video in the at least one candidate path navigation video, when broadcasting a position associated with position information in the candidate path navigation video, route confirmation prompt information is displayed, the route confirmation prompt information being configured to prompt the user to determine whether the navigation path is deviated, and the position information being position information corresponding to a target image captured by a video capturing apparatus in a stationary status during capturing the mobile video; when receiving a route replanning instruction based on the route confirmation prompt information, the target device sends a route replanning request to the server. When receiving the route replanning request sent by the target device, the server acquires a new target path navigation video according to the route replanning request and sends the new target path navigation video to the target device, such that the target device performs a navigation based on the new target path navigation video.

It should be explained that, since when storing the multiple candidate path navigation videos decomposed from the mobile video, the server associates each candidate path navigation video with the position information, for each candidate path navigation video in the at least one candidate path navigation video, when broadcasting a position in the candidate path navigation video associated with the position information, the target device may pause the broadcasting of the candidate path navigation video and display the route confirmation prompt information.

When receiving a replanning instruction, the target device may determine that the currently navigated navigation path is not in conformity with the desired path of the user, then the target device may replan the navigation path via the server. Further, when receiving a confirmation instruction based on the route confirmation prompt information, the target device determines that the currently navigated navigation path is in conformity with the desired path of the user, then the target device may continue to broadcast the candidate path navigation video, and if the currently broadcasted candidate path navigation video is a last candidate path navigation video in the at least one candidate path navigation video, the candidate path navigation video is stopped to be broadcasted.

It should be explained that, the route confirmation prompt information may be text information, voice information, or a combination of the text information and the voice information, which is not particularly defined by the embodiments of the present disclosure. In addition, the route replanning instruction and the confirmation instruction may be triggered by the user via a designated operation, which is not particularly defined by the embodiments of the present disclosure.

Further, when the server receives the route replanning request sent by the target device, if the route replanning request carries new start point information, the server may reselect the target path navigation video based on the new start point information and the end point information; and send the reselected target path navigation video to the target device such that the target device performs the navigation based on the reselected target path navigation video.

It should be explained, when performing an indoor navigation, the place where the target device sends the route replanning request may be the same as the place of the original start point information, or may be different from the place of the original start point information. Thereby, the route replanning request sent by the target device to the server may not carry new geographical location information, or may carry new geographical location information, the new geographical location information being geographical location information of a place where the target device sends the route replanning request. If the route replanning request does not carry new geographical location information, the server may reselect the target path navigation video from the multiple candidate path navigation videos acquired in the step 302. If the route replanning request carries new geographical location information, the server may reacquire the multiple candidate path navigation videos corresponding to the new geographical location information from the stored multiple candidate path navigation videos based on the new geographical location information, then select the target path navigation video based on the reacquired multiple candidate path navigation videos.

In the embodiments of the present disclosure, when performing an outdoor navigation, via the target path navigation video, the navigation may be performed more intuitively, and the navigation threshold is lowered; and when performing an indoor navigation, the reference information or text information naturally existing in the indoor place may be adopted as an identification point, and the navigation is performed by identifying the reference information or the text information in the navigation video so as to determine the target path navigation video on the target path, thereby a uniform infrared sensor installed by manual is saved, the universality and applicability are strong, and a mass of physical apparatuses and labor forces are saved. In addition, during performing the navigation by using the target path navigation video, the user may judge whether a deviation occurs in the currently navigated target path by determining the target path navigation video and the actual path in real time, and if the deviation occurs, the target path navigation video may be determined again, which improves the accuracy of the navigation.

Figure 4:
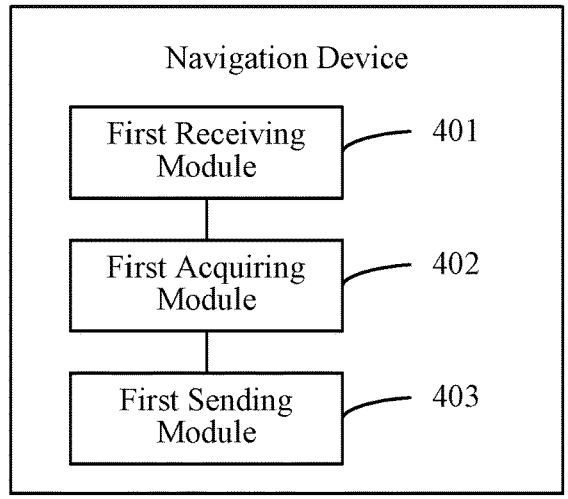
FIG. 4 is a block diagram of a navigation device, according to an exemplary embodiment.

FIG. 4 is a block diagram of a navigation device, according to an exemplary embodiment. As shown in FIG. 4, the device includes a first receiving module 401, a first acquiring module 402, and a first sending module 403.

The first receiving module 401 is configured to receive start point information and end point information sent by a target device.

The first acquiring module 402 is configured to acquire a target path navigation video from a start point to an end point based on the start point information and the end point information received by the first receiving module 401.

The first sending module 403 is configured to send the target path navigation video acquired by the first acquiring module 402 to the target device.

Figure 5:
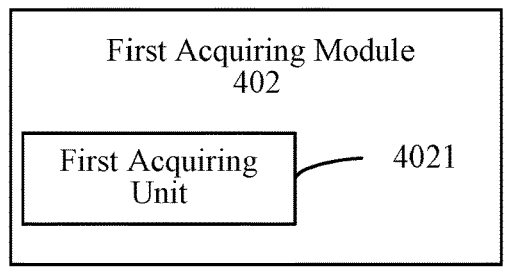
FIG. 5 is a block diagram of a first acquiring module, according to an exemplary embodiment.

In another embodiment of the present disclosure, as shown in FIG. 5, the first acquiring module 402 includes a first acquiring unit 4021.

The first acquiring unit 4021 is configured to acquire the target path navigation video based on start point position information and end point position information, the start point information including the start point position information, and the end point information including the end point position information.

Figure 6:
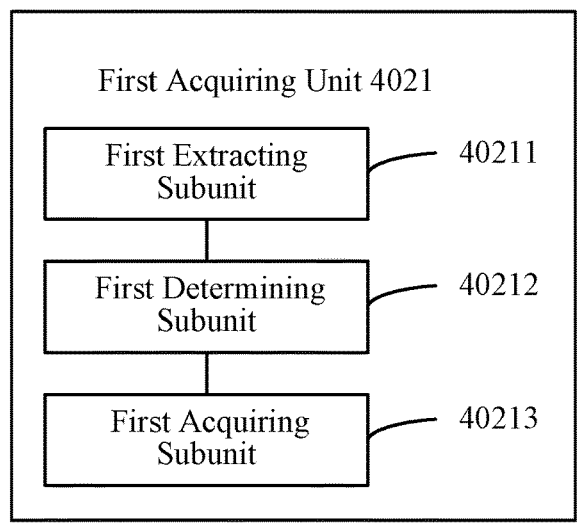
FIG. 6 is a block diagram of a first acquiring unit, according to an exemplary embodiment.

In another embodiment of the present disclosure, as shown in FIG. 6, the start point information includes a start point environment image, and the end point information includes an end point environment image. The first acquiring unit 4021 includes: a first extracting subunit 40211, a first determining subunit 40212, and a first acquiring subunit 40213.

The first extracting subunit 40211 is configured to extract start point reference information from the start point environment image, and extract end point reference information from the end point environment image.

The first determining subunit 40212 is configured to determine the start point reference information extracted by the first extracting subunit 40211 as the start point position information, and determine the end point reference information extracted by the first extracting subunit 40211 as the end point position information.

The first acquiring subunit 40213 is configured to acquire the target path navigation video based on the start point reference information and the end point reference information determined by the first determining subunit 40212.

Figure 7:
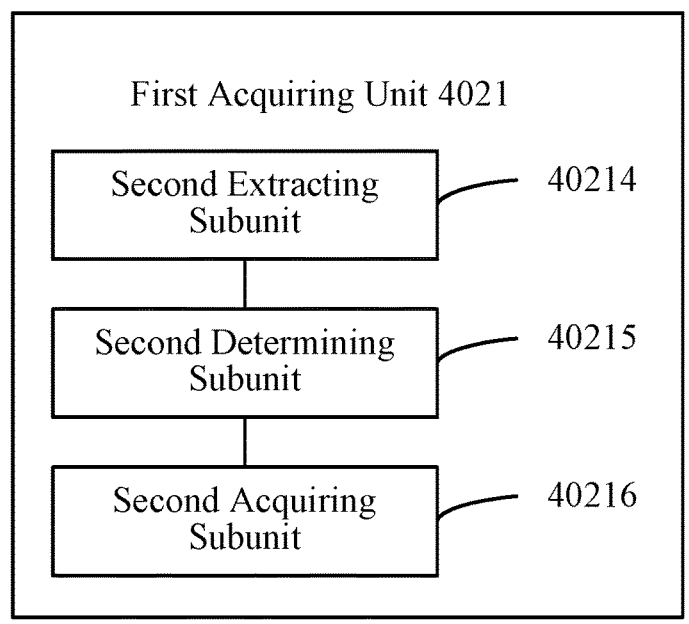
FIG. 7 is a block diagram of a first acquiring unit, according to an exemplary embodiment.

In another embodiment of the present disclosure, as shown in FIG. 7, the start point information includes a start point environment image, and the end point information includes an end point environment image; and the first acquiring unit 4021 includes: a second extracting subunit 40214, a second determining subunit 40215, and a second acquiring subunit 40216.

The second extracting subunit 40214 is configured to extract start point text information from the start point environment image, and extract end point text information from the end point environment image.

The second determining subunit 40215 is configured to determine the start point text information extracted by the second extracting subunit 40214 as the start point position information, and determining the end point text information extracted by the second extracting subunit as the end point position information.

The second acquiring subunit 40216 is configured to acquire the target path navigation video based on the start point text information and the end point text information determined by the second determining subunit 40215.

Figure 8:
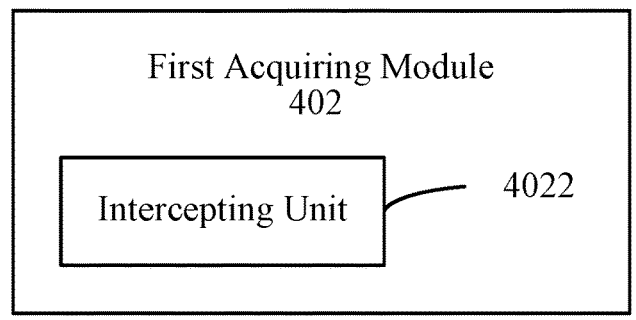
FIG. 8 is a block diagram of a first acquiring module, according to an exemplary embodiment.

In another embodiment of the present disclosure, as shown in FIG. 8, the first acquiring module 402 includes: an intercepting unit 4022.

The intercepting unit 4022 is configured to intercept the target path navigation video from one stored candidate path navigation video based on the start point information and the end point information.

Figure 9:
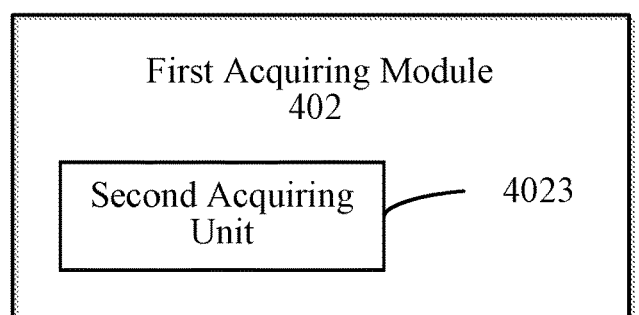
FIG. 9 is a block diagram of a first acquiring module, according to an exemplary embodiment.

In another embodiment of the present disclosure, as shown in FIG. 9, the first acquiring module 402 includes: a second acquiring unit 4023.

The second acquiring unit 4023 is configured to acquire the target path navigation video from a plurality of stored candidate path navigation videos based on the start point information and the end point information.

Figure 10:
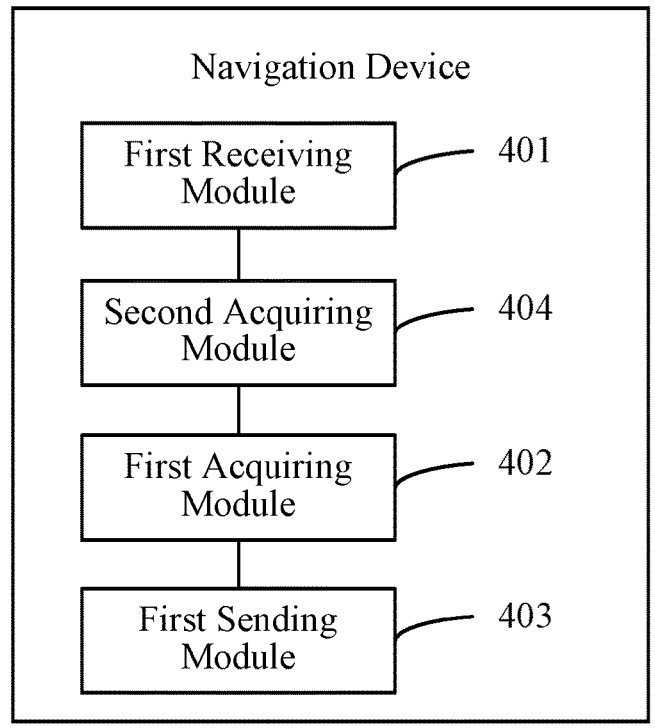
FIG. 10 is a block diagram of a navigation device, according to an exemplary embodiment.

In another embodiment of the present disclosure, as shown in FIG. 10, the device further includes: a second acquiring module 404.

The second acquiring module 404 is configured to acquire a candidate path navigation video.

Figure 11:
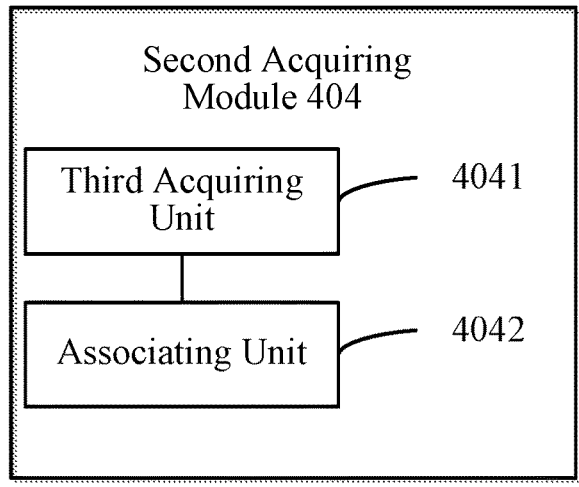
FIG. 11 is a block diagram of a second acquiring module, according to an exemplary embodiment.

In another embodiment of the present disclosure, as shown in FIG. 11, the second acquiring module 404 includes: a third acquiring unit 4041, and an associating unit 4042.

The third acquiring unit 4041 is configured to acquire a mobile video and position information, the position information being position information corresponding to a target image captured by a video capturing apparatus in a stationary status during capturing the mobile video.

The associating unit 4042 is configured to associate the position information acquired by the third acquiring unit with the target image so as to obtain the candidate path navigation video.

In another embodiment of the present disclosure, the position information includes reference information or text information.

Figure 12:
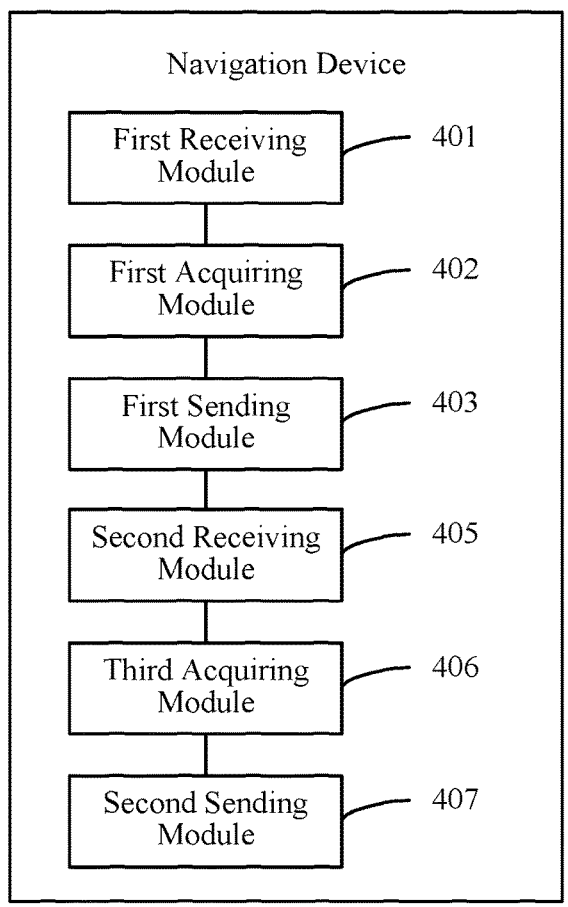
FIG. 12 is a block diagram of a navigation device, according to an exemplary embodiment.

In another embodiment of the present disclosure, as shown in FIG. 12, the device further includes: a second receiving module 405, a third acquiring module 406, and a second sending module 407.

The second receiving module 405 is configured to receive a path replanning request sent by the target device.

The third acquiring module 406 is configured to acquire a new target path navigation video based on the path replanning request received by the second receiving module 405.

The second sending module 407 is configured to send the new target path navigation video acquired by the third acquiring module 406 to the target device, such that the target device performs navigation based on the new target path navigation video.

In the embodiments of the present disclosure, the start point information and the end point information sent by the target device are received, the target path navigation video from the start point to the end point is acquired based on the start point information and the end point information, and the target path navigation video is sent to the target device, such that the target device performs navigation based on the target path navigation video, in this way, the uniform infrared sensor installed by manual is saved, the universality and applicability are strong, and a mass of physical apparatuses and labor forces are saved.

With respect to the devices in the above embodiments, the specific manners for performing operations for individual modules therein have been described in detail in the embodiments regarding the methods, which will not be elaborated herein.

Figure 13:
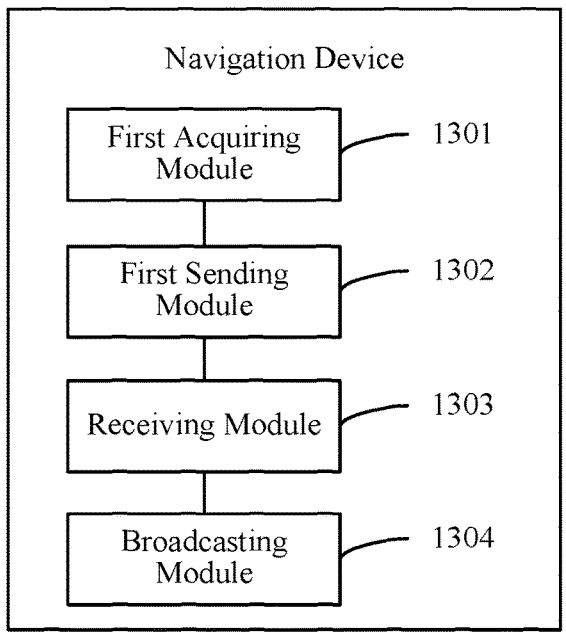
FIG. 13 is a block diagram of a navigation device, according to an exemplary embodiment.

FIG. 13 is a block diagram of a navigation device, according to an exemplary embodiment. As shown in FIG. 13, the device includes: a first acquiring module 1301, a first sending module 1302, a receiving module 1303, and a broadcasting module 1304.

The first acquiring module 1301 is configured to acquire start point information and end point information.

The first sending module 1302 is configured to send the start point information and the end point information acquired by the first acquiring module 130 to a server.

The receiving module 1303 is configured to receive a target path navigation video from a start point to an end point sent by the server, the target path navigation video being acquired by the server based on the start point information and the end point information sent by the first sending module 1302.

The broadcasting module 1304 is configured to, in response to receiving an instructions for starting navigation, broadcast the target path navigation video received by the receiving module 1303.

Figure 14:
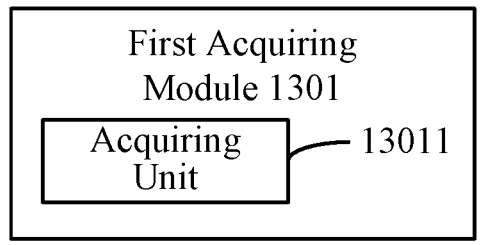
FIG. 14 is a block diagram of a first acquiring module, according to an exemplary embodiment.

In another embodiment of the present disclosure, as shown in FIG. 14, the first acquiring module 1301 includes: an acquiring unit 13011.

The acquiring unit 13011 is configured to, when receiving a navigation instruction, acquire the start point environment image and the end point environment image.

Figure 15:
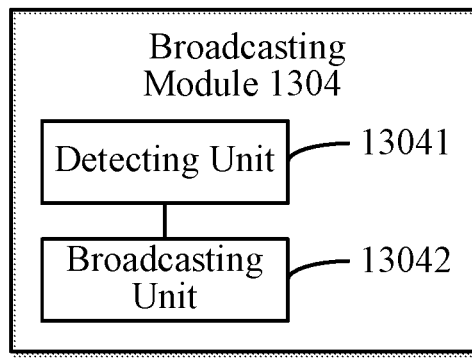
FIG. 15 is a block diagram of a broadcasting module, according to an exemplary embodiment.

In another embodiment of the present disclosure, as shown in FIG. 15, the broadcasting module 1304 includes: a detecting unit 13041, and a broadcasting unit 13042.

The detecting unit 13041 is configured to detect a current movement speed.

The broadcasting unit 13042 is configured to broadcast the target path navigation video based on the movement speed detected by the detecting unit, such that a broadcasting speed of the target path navigation video is equal to the movement speed.

Figure 16:
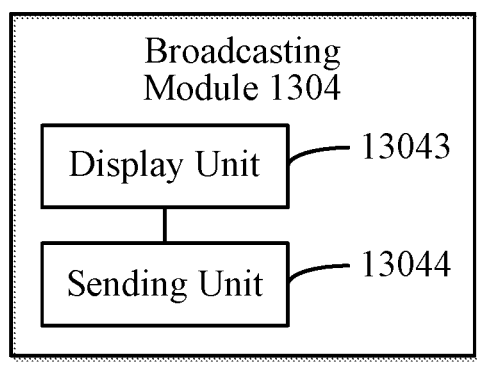
FIG. 16 is a block diagram of a broadcasting module, according to an exemplary embodiment.

In another embodiment of the present disclosure, as shown in FIG. 16, the broadcasting module includes: a display unit 13043, and a sending unit 13044.

The display unit 13043 is configured to, when a target image position in the target path navigation video is broadcasted, display route confirmation prompt information, the route confirmation prompt information being configured to prompt a user to confirm whether a deviation from the target path occurs.

The sending unit 13044 is configured to, when receiving a route replanning instruction based on the route confirmation prompt information displayed by the display unit, send a route replanning request to the server, such that the server acquires a new target path navigation video based on the route replanning request.

Figure 17:
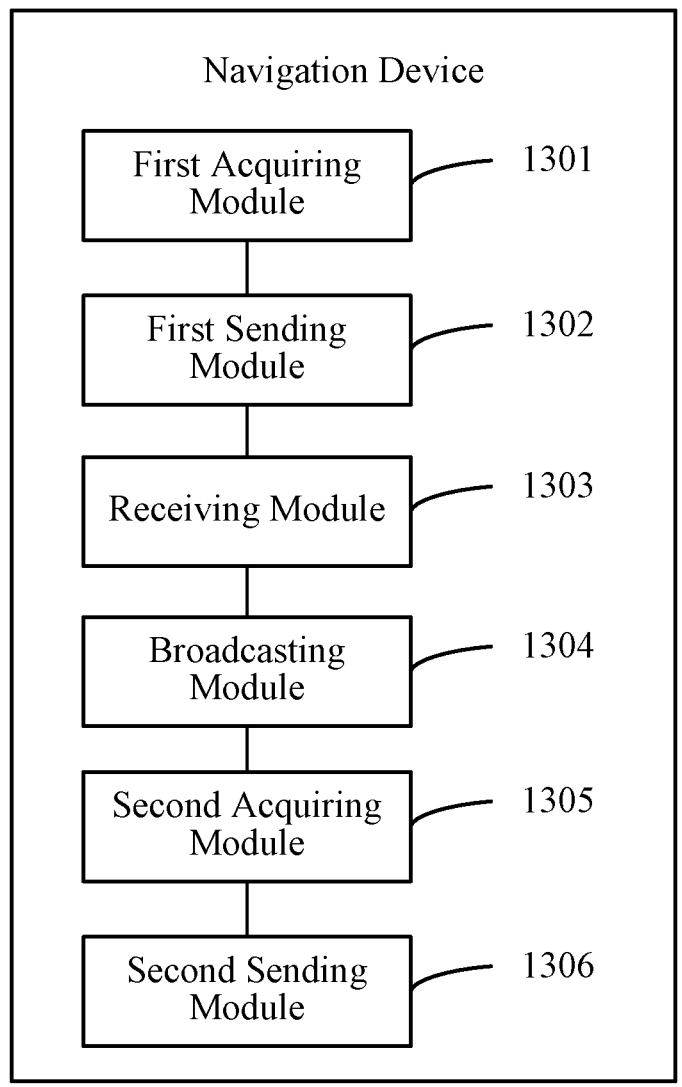
FIG. 17 is a block diagram of a navigation device, according to an exemplary embodiment.

In another embodiment of the present disclosure, as shown in FIG. 17, the device further includes: a second acquiring module 1305, and a second sending module 1306.

The second acquiring module 1305 is configured to acquire a mobile video and position information.

The second sending module 1306 is configured to, send the mobile video and the position information acquired by the second acquiring module to the server, such that the server associates the mobile video with a target image, the position information being position information corresponding to the target image captured in a stationary status during capturing the mobile video.

Figure 18:
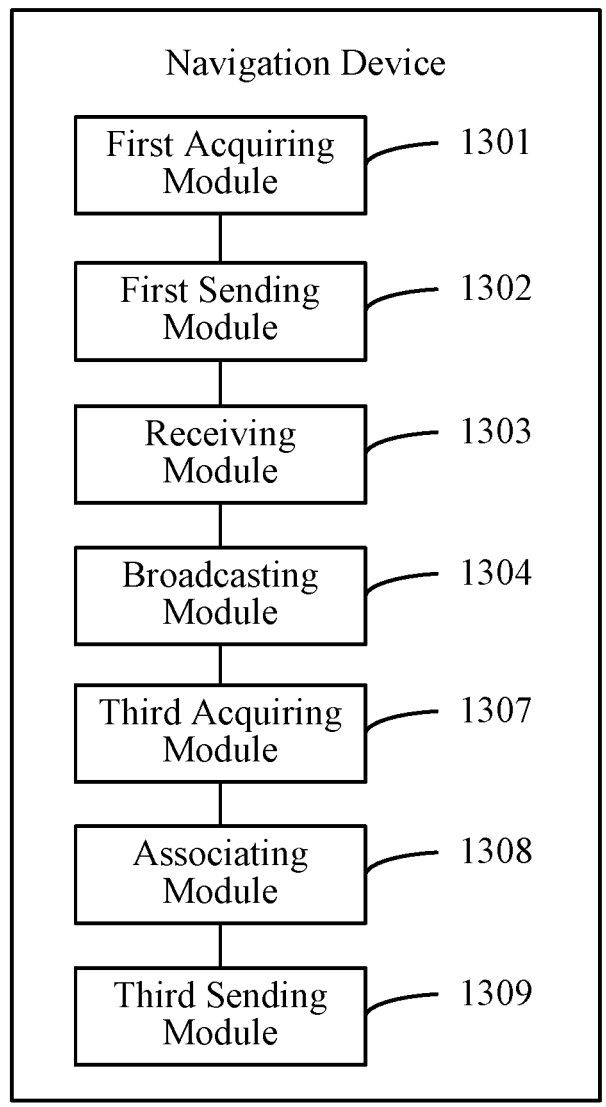
FIG. 18 is a block diagram of a navigation device, according to an exemplary embodiment.

In another embodiment of the present disclosure, as shown in FIG. 18, the device further includes: a third acquiring module 1307, an associating module 1308, and a third sending module 1309.

The third acquiring module 1307 is configured to acquire a mobile video and position information.

The associating module 1308 is configured to associate the mobile video acquired by the third acquiring module with a target image so as to obtain a candidate path navigation video, the position information being position information corresponding to the target image captured in a stationary status during capturing the mobile video.

The third sending module 1309 is configured to send the candidate path navigation video obtained by the association by the associating module to the server.

In the embodiments of the present disclosure, the start point information and the end point information sent by the target device are received, the target path navigation video from the start point to the end point is acquired based on the start point information and the end point information, and the target path navigation video is sent to the target device, such that the target device performs navigation based on the target path navigation video, in this way, the uniform infrared sensor installed by manual is saved, the universality and applicability are strong, and a mass of physical apparatuses and labor forces are saved.

With respect to the devices in the above embodiments, the specific manners for performing operations for individual modules therein have been described in detail in the embodiments regarding the methods, which will not be elaborated herein.

Figure 19:
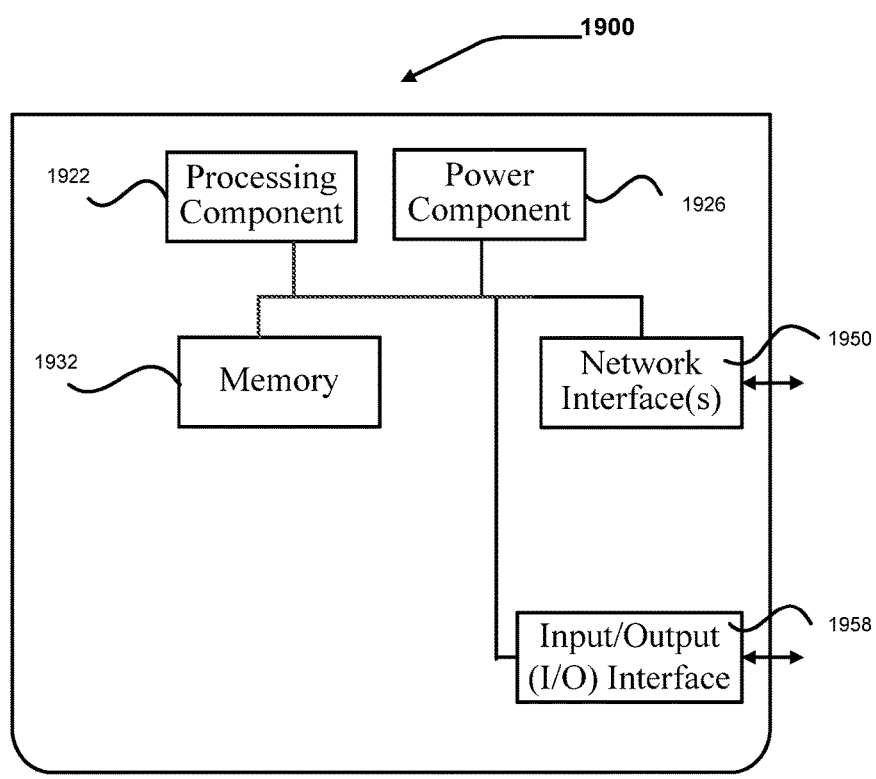
FIG. 19 is a block diagram of a device for navigation, according to an exemplary embodiment.

FIG. 19 is a block diagram of a device 1900 for navigation, according to an exemplary embodiment. For example, the device 1900 may be provided as a server. Referring to FIG. 19, the device 1900 includes a processing component 1922 that further includes one or more processors, and memory resources represented by a memory 1932 for storing instructions executable by the processing component 1922, such as application programs. The application programs stored in the memory 1932 may include one or more modules each corresponding to a set of instructions. The device 1900 may also include a power component 1926 configured to perform power management of the device 1900, wired or wireless network interface(s) 1950 configured to connect the device 1900 to a network, and an input/output (I/O) interface 1958. The device 1900 may operate based on an operating system stored in the memory 1932, such as Windows Server™, Mac OS X™, Unix™, Linux, FreeBSD™, or the like.

In addition, the processing component 1922 is configured to execute instructions so as to carry out the navigation method as described above.

Figure 20:
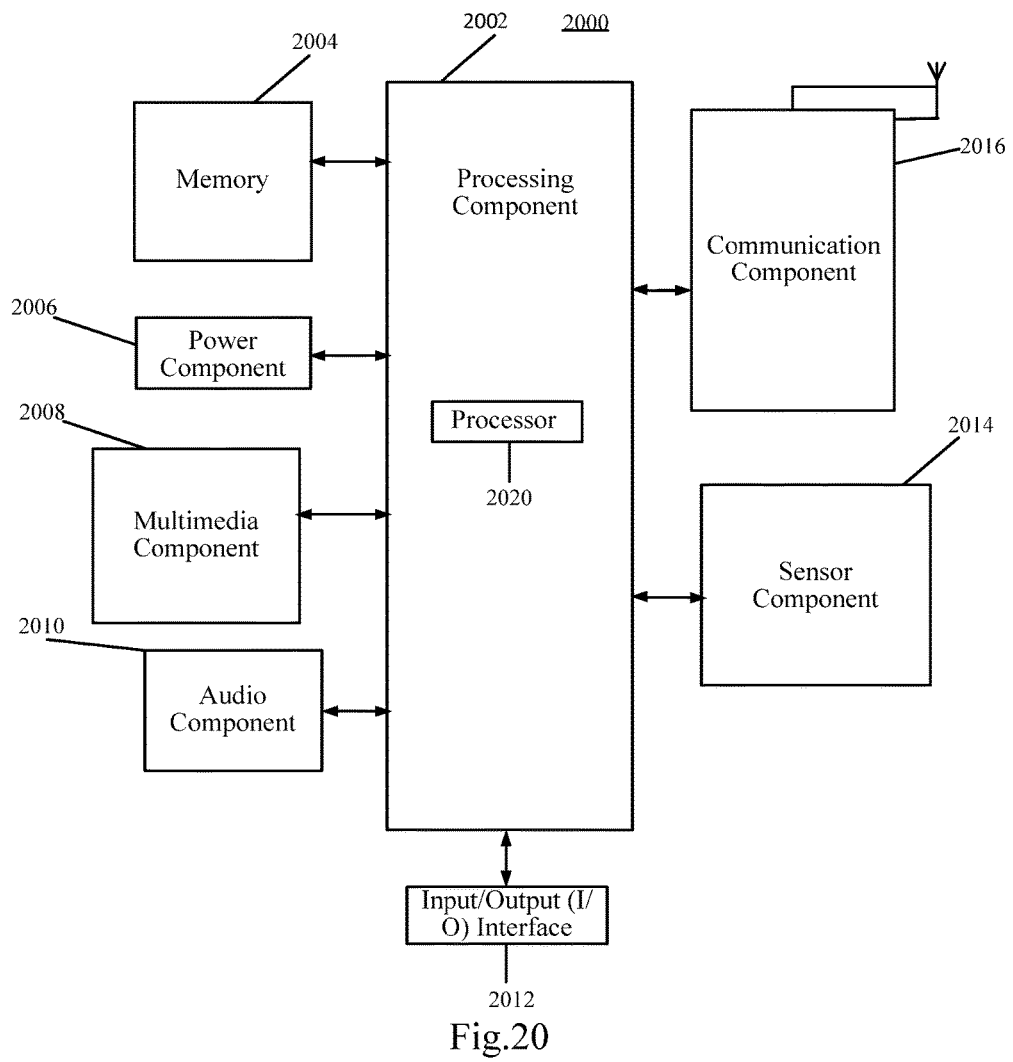
FIG. 20 is a block diagram of a device for navigation, according to an exemplary embodiment.

FIG. 20 is a block diagram of a device 2000 for navigation, according to an exemplary embodiment. For example, the device 2000 may be a mobile phone, a computer, a digital broadcast terminal, a messaging device, a gaming console, a tablet, a medical device, exercise equipment, a personal digital assistant, smart glasses, a smart watch and the like.

Referring to FIG. 20, the device 2000 may include one or more of the following components: a processing component 2002, a memory 2004, a power component 2006, a multimedia component 2008, an audio component 2010, an input/output (I/O) interface 2012, a sensor component 2014, and a communication component 2016.

The processing component 2002 typically controls overall operations of the device 2000, such as the operations associated with display, telephone calls, data communications, camera operations, and recording operations. The processing component 2002 may include one or more processors 2020 to execute instructions to perform all or part of the steps in the above described methods. Moreover, the processing component 2002 may include one or more modules which facilitate the interaction between the processing component 2002 and other components. For instance, the processing component 2002 may include a multimedia module to facilitate the interaction between the multimedia component 2008 and the processing component 2002.

The memory 2004 is configured to store various types of data to support the operation of the device 2000. Examples of such data include instructions for any applications or methods operated on the device 2000, contact data, phonebook data, messages, pictures, video, etc. The memory 2004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2006 provides power to various components of the device 2000. The power component 2006 may include a power management system, one or more power sources, and any other components associated with the generation, management, and distribution of power in the device 2000.

The multimedia component 2008 includes a screen providing an output interface between the device 2000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2008 includes a front camera and/or a rear camera. The front camera and/or the rear camera may receive an external multimedia datum while the device 2000 is in an operation mode, such as a photographing mode or a video mode. Each of the front camera and the rear camera may be a fixed optical lens system or have focus and optical zoom capability.

The audio component 2010 is configured to output and/or input audio signals. For example, the audio component 2010 includes a microphone ("MIC") configured to receive an external audio signal when the device 2000 is in an operation mode, such as a call mode, a recording mode, and a voice recognition mode. The received audio signal may be further stored in the memory 2004 or transmitted via the communication component 2016. In some embodiments, the audio component 2010 further includes a speaker to output audio signals.

The I/O interface 2012 provides an interface between the processing component 2002 and peripheral interface modules, such as a keyboard, a click wheel, buttons, and the like. The buttons may include, but are not limited to, a home button, a volume button, a starting button, and a locking button.

The sensor component 2014 includes one or more sensors to provide status assessments of various aspects of the device 2000. For instance, the sensor component 2014 may detect an open/closed status of the device 2000, relative positioning of components, e.g., the display and the keypad, of the device 2000, a change in position of the device 2000 or a component of the device 2000, a presence or absence of user contact with the device 2000, an orientation or an acceleration/deceleration of the device 2000, and a change in temperature of the device 2000. The sensor component 2014 may include a proximity sensor configured to detect the presence of nearby objects without any physical contact. The sensor component 2014 may also include a light sensor, such as a CMOS or CCD image sensor, for use in imaging applications. In some embodiments, the sensor component 2014 may also include an accelerometer sensor, a gyroscope sensor, a magnetic sensor, a pressure sensor, or a temperature sensor.

The communication component 2016 is configured to facilitate communication, wired or wirelessly, between the device 2000 and other devices. The device 2000 can access a wireless network based on a communication standard, such as WiFi, 2Q or 3Q or a combination thereof. In one exemplary embodiment, the communication component 2016 receives a broadcast signal or broadcast associated information from an external broadcast management system via a broadcast channel. In one exemplary embodiment, the communication component 2016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 2000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 2004 including instructions, the above instructions are executable by the processor 2020 in the device 2000, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium, when instructions in the storage medium is executed by a processor of the target device, enables the target device to perform a navigation method as described above.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the extract construction that has been described above and illustrated in the accompanying drawings, and that various modifications and changes can be made without departing from the scope thereof. It is intended that the scope of the invention only be limited by the appended claims.

What is claimed is:

1. A navigation method, comprising:
    acquiring, by a Global Positioning System of a mobile terminal, start point information;
    acquiring, by a processor of the mobile terminal, end point information;
    sending, by a processor of the mobile terminal, the start point information and the end point information to a server;
    acquiring, by the processor of the server, a target path navigation video from a start point to an end point based on the start point information and the end point information; and
    sending, by the processor of the server, the target path navigation video to the mobile terminal,
    wherein after sending the target path navigation video to the mobile terminal, the method further comprises:
    receiving, by the processor of the server, a path replanning request sent by the mobile terminal;

acquiring, by the processor of the server, a new target path navigation video based on the path replanning request;

sending, by the processor of the server, the new target path navigation video to the mobile terminal; and performing, by the processor of the mobile terminal, a navigation based on the target path navigation video or the new target path navigation video.

2. The method according to claim 1, wherein the acquiring, by the processor of the server, the target path navigation video from the start point to the end point based on the start point information and the end point information comprises:

acquiring, by the processor of the server, the target path navigation video based on start point position information and end point position information, the start point information comprising the start point position information, and the end point information comprising the end point position information.

3. The method according to claim 2, wherein the start point information comprises a start point environment image, and the end point information comprises an end point environment image; and the acquiring, by the processor of the server, the target path navigation video based on the start point information and the end point information comprises:

extracting, by the processor of the server, start point reference information from the start point environment image, and extracting end point reference information from the end point environment image;

determining, by the processor of the server, the start point reference information as the start point position information, and determining the end point reference information as the end point position information; and acquiring, by the processor of the server, the target path navigation video based on the start point reference information and the end point reference information.

4. The method according to claim 2, wherein the start point information comprises a start point environment image, and the end point information comprises an end point environment image; and the acquiring, by the processor of the server, the target path navigation video based on the start point information and the end point information comprises:

extracting, by the processor of the server, start point text information from the start point environment image, and extracting end point text information from the end point environment image;

determining, by the processor of the server, the start point text information as the start point position information, and determining the end point text information as the end point position information; and acquiring, by the processor of the server, the target path navigation video based on the start point text information and the end point text information.

5. The method according to claim 1, wherein the acquiring, by the processor of the server, the target path navigation video from the start point to the end point based on the start point information and the end point information comprises:

intercepting, by the processor of the server, the target path navigation video from one stored candidate path navigation video based on the start point information and the end point information.

6. The method according to claim 1, wherein the acquiring, by the processor of the server, the target path navigation video from the start point to the end point based on the start point information and the end point information comprises:

acquiring, by the processor of the server, the target path navigation video from a plurality of stored candidate path navigation videos based on the start point information and the end point information.

7. The method according to claim 1, wherein before acquiring, by the processor of the server, the target path navigation video from the start point to the end point based on the start point information and the end point information, the method further comprises:

acquiring, by the processor of the server, a candidate path navigation video.

8. The method according to claim 7, wherein the acquiring, by the processor of the server, the candidate path navigation video comprises:

acquiring, by the processor of the server, a mobile video and position information, the position information being position information corresponding to a target image captured by a video capturing apparatus in a stationary status during capturing the mobile video; and associating, by the processor of the server, the position information with the target image so as to obtain the candidate path navigation video.

9. A system for navigation, comprising:

a server comprising a processor and a memory for storing instructions executable by the processor of the server;

a mobile terminal comprising a processor and a memory for storing instructions executable by the processor of the mobile terminal, wherein the processor of the mobile terminal is configured to:

acquiring, by a Global Positioning System of the mobile terminal, start point information;

acquiring end point information; and sending the start point information and the end point information to the server;

wherein the processor of the server is configured to:

receive start point information and end point information sent by the mobile terminal;

acquire a target path navigation video from a start point to an end point based on the start point information and the end point information; and send the target path navigation video to the mobile terminal, wherein the processor of the server is further configured to:

receive a path replanning request sent by the mobile terminal;

acquire a new target path navigation video based on the received path replanning request; and send the acquired new target path navigation video to the mobile terminal;

wherein the processor of the mobile terminal is further configured to:

perform a navigation based on the target path navigation video or the new target path navigation video.

10. The system according to claim 9, wherein the processor of the server is further configured to:

acquire the target path navigation video based on start point position information and end point position information, the start point information comprising the start point position information, and the end point information comprising the end point position information.

11. The system according to claim 10, wherein the start point information comprises a start point environment image, and the end point information comprises an end point environment image; and the processor of the server is further configured to:
extract start point reference information from the start point environment image, and extract end point reference information from the end point environment image;
determine the extracted start point reference information as the start point position information, and determine the extracted end point reference information as the end point position information; and
acquire the target path navigation video based on the determined start point reference information and end point reference information.

12. The system according to claim 10, wherein the start point information comprises a start point environment image, and the end point information comprises an end point environment image; and
the processor of the server is further configured to:
extract start point text information from the start point environment image, and extract end point text information from the end point environment image;
determine the extracted start point text information as the start point position information, and determine the extracted end point text information as the end point position information; and
acquire the target path navigation video based on the determined start point text information and end point text information.

13. The system according to claim 9, wherein the processor of the server is further configured to:
intercept the target path navigation video from one stored candidate path navigation video based on the start point information and the end point information.

14. The system according to claim 9, wherein the processor of the server is further configured to:
acquire the target path navigation video from a plurality of stored candidate path navigation videos based on the start point information and the end point information.

15. The system according to claim 9, wherein the processor of the server is further configured to:
acquire a candidate path navigation video.

16. The system according to claim 15, wherein the processor of the server is further configured to:
acquire a mobile video and position information, the position information being position information corresponding to a target image captured by a video capturing apparatus in a stationary status during capturing the mobile video; and
associate the acquired position information with the target image so as to obtain the candidate path navigation video.

* * * * *